United States Patent
Rawson et al.

[19]

[11] Patent Number: 5,855,248
[45] Date of Patent: Jan. 5, 1999

[54] TRACK DRIVE CONVERSION APPARATUS FOR WHEEL DRIVEN VEHICLE

[76] Inventors: Ray E. Rawson, 7413 N. Nottawa; Steven Ray Rawson, 854 W. Battle Rd.; David Ray Rawson, 7689 N. Nottawa, all of Farwell, Mich. 48622

[21] Appl. No.: 645,801

[22] Filed: May 14, 1996

[51] Int. Cl.⁶ .................................................. B62D 55/04
[52] U.S. Cl. ........................................ 180/9.21; 180/9.26
[58] Field of Search .................................. 180/9.1, 9.21, 180/9.26, 9.28, 9.3, 9.48

[56] References Cited

U.S. PATENT DOCUMENTS

| | | | |
|---|---|---|---|
| 1,659,297 | 2/1928 | Langenfeld | 180/9.26 |
| 1,697,915 | 1/1929 | Fast | 180/9.26 |
| 2,057,211 | 10/1936 | Shere | 180/9.21 |
| 2,627,442 | 2/1953 | Junker | 180/9.26 |
| 3,651,879 | 3/1972 | Wilson | 180/9.1 |
| 3,933,214 | 1/1976 | Guibord et al. | 180/9.1 |
| 4,072,203 | 2/1978 | Pierson | 180/9.44 |
| 4,352,340 | 10/1982 | Von der Lely | 180/9.21 |
| 4,516,649 | 5/1985 | Braathen | 180/9.1 |
| 4,560,018 | 12/1985 | Satzler | 180/9.26 |
| 4,706,769 | 11/1987 | Latourelle et al. | 180/9.21 |
| 4,949,800 | 8/1990 | Virly | 180/9.21 |
| 4,987,841 | 1/1991 | Rawson et al. | 111/121 |
| 5,293,948 | 3/1994 | Crabb | 180/9.1 |
| 5,349,911 | 9/1994 | Horst et al. | 111/139 |
| 5,361,860 | 11/1994 | Smith et al. | 180/9.1 |
| 5,368,115 | 11/1994 | Crabb | 180/9.1 |
| 5,370,068 | 12/1994 | Rawson et al. | 111/121 |
| 5,388,624 | 2/1995 | Nordstrom et al. | 152/185.1 |
| 5,388,656 | 2/1995 | Lagasse | 180/9.21 |
| 5,452,949 | 9/1995 | Kelderman | 305/24 |
| 5,462,124 | 10/1995 | Rawson | 172/569 |
| 5,473,999 | 12/1995 | Rawson et al. | 111/127 |

FOREIGN PATENT DOCUMENTS

| | | | |
|---|---|---|---|
| 0070101 | 4/1928 | Sweden | 180/9.26 |

*Primary Examiner*—Randolph A. Reese
*Assistant Examiner*—John L. Beres
*Attorney, Agent, or Firm*—Young & Basile, P.C.

[57] ABSTRACT

A supporting wheel substitute or track drive conversion apparatus is connectible to a driven wheel of a vehicle having a support frame. A frame is pivotally connectible to the support frame of the vehicle for movement in a vertical plane relative to the support frame of the vehicle. An end wheel is positionable spaced longitudinally from the driven wheel of the vehicle along the frame. Adjustable members selectively secure the end wheel in various longitudinal positions along the frame with respect to the driven wheel of the vehicle. An endless, flexible track is trainable over the end wheel and the driven wheel of the vehicle and is engageable with a surface over which the vehicle is traveling.

17 Claims, 2 Drawing Sheets

TRACK DRIVE CONVERSION APPARATUS FOR WHEEL DRIVEN VEHICLE

FIELD OF THE INVENTION

The present invention relates to a supporting wheel substitute to engage the surface over which the vehicle moves, and more particularly to a motor vehicle having at least one end portion of a track trained over a supporting structure including an end wheel selectively securable in various positions with respect to a driven wheel, wherein the supporting frame is mounted for movement in a vertical plane relative to the vehicle frame.

BACKGROUND OF THE INVENTION

Off road vehicles, such as farm vehicles, agricultural implements, or the like, typically are quite heavy and can have difficulty in traversing fields or trails having soft, wet and loose soil conditions, because the entire weight of the vehicle is distributed over a relatively small area on the supporting wheels of the vehicle. In addition, the wheels of these vehicles cause compaction of the soil which can be adverse to growing crops in the soil, which typically prefer loose, relatively uncompacted soil. Often, it is desirable to enter a particular field when the field is still extremely wet in order to perform necessary farming procedures to begin processing the soil for later cultivation and/or planting. It is very common for the fields to be too wet for an ordinary farm vehicle or agricultural implement to enter the fields, particularly in the early spring. If entry into the field is attempted, the vehicle typically becomes immediately bogged down in the mud due to the fact that the supporting wheels have a relatively small area in contact with the ground surface over which the vehicle is traveling. Therefore, it would be desirable to increase the area of the traction-structure engaging the ground surface over which the vehicle is traveling in order to reduce the compaction of the soil and to reduce the probability of becoming bogged down in the mud.

SUMMARY OF THE INVENTION

The present invention relates to an apparatus for converting a wheel driven vehicle having a support frame to a track driven vehicle. The apparatus according to the present invention can include a frame pivotally connectible to the support frame of the vehicle. The frame extends longitudinally along the support frame inboard of the driven wheel for movement in a vertical plane with respect to the support frame of the vehicle. An end wheel is supported from the frame for selective longitudinal adjustment along the frame with respect to the drive wheel. A track is provided for encircling the driven wheel and the end wheel in an endless loop, so that rotation of the driven wheel in either direction rotates the track in the same rotational direction as the end wheel.

A supporting wheel substitute according to the present invention is connectible to a driven wheel of a vehicle having a support frame. The supporting wheel substitute includes a frame pivotally connectible to the support frame of the vehicle for movement in a vertical plane relative to the support frame of the vehicle. An end wheel is positionable spaced longitudinally from the driven wheel of the vehicle along the frame. Adjustable means selectively secures the end wheel in various longitudinal positions along the frame with respect to the driven wheel of the vehicle. An endless, flexible track is trainable over the end wheel and the driven wheel of the vehicle to be engageable with a ground surface over which the vehicle is moving.

It is desirable in the present invention to provide a track drive conversion apparatus for wheel driven vehicles. Furthermore, it is desirable in the present invention to provide a supporting wheel substitute that can be releasibly connected to existing wheel driven vehicles. In addition, it is desirable in the present invention to provide frame means pivotally connectible to the support frame of the vehicle for movement in a vertical plane with respect to the support frame of the vehicle, in a suitable manner such that the frame means can remain on the vehicle after removal of the end wheel and track without adversely effecting the performance or ground clearance of the vehicle.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
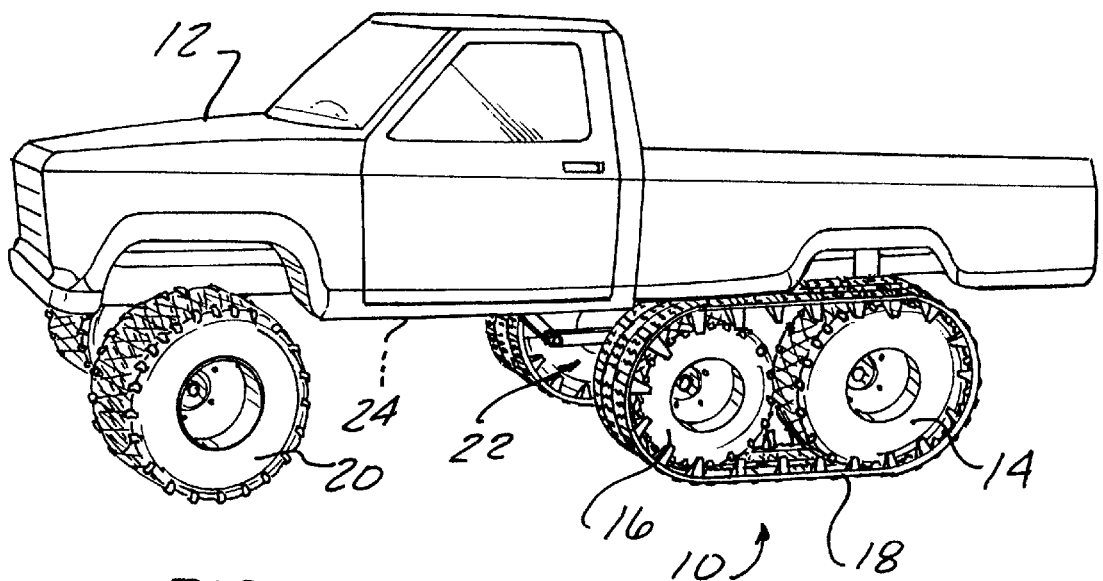
FIG. 1 is a perspective view of a wheel driven vehicle having a track drive conversion apparatus according to the present invention attached thereto.
Figure 3:
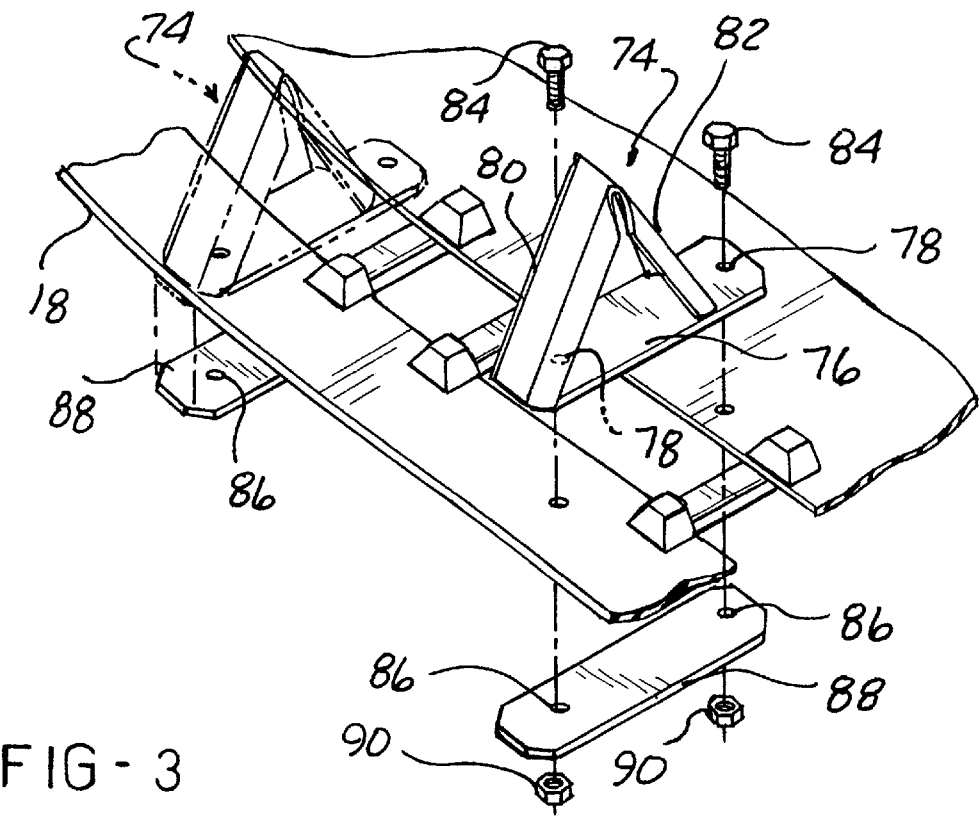
FIG. 3 is a detailed, exploded perspective view of radially inwardly extending protrusions spaced circumferentially around an inner surface of the track adjacent both an outboard edge of the track according to the present invention, the inboard edge being a mirror image thereof.
Figure 2:
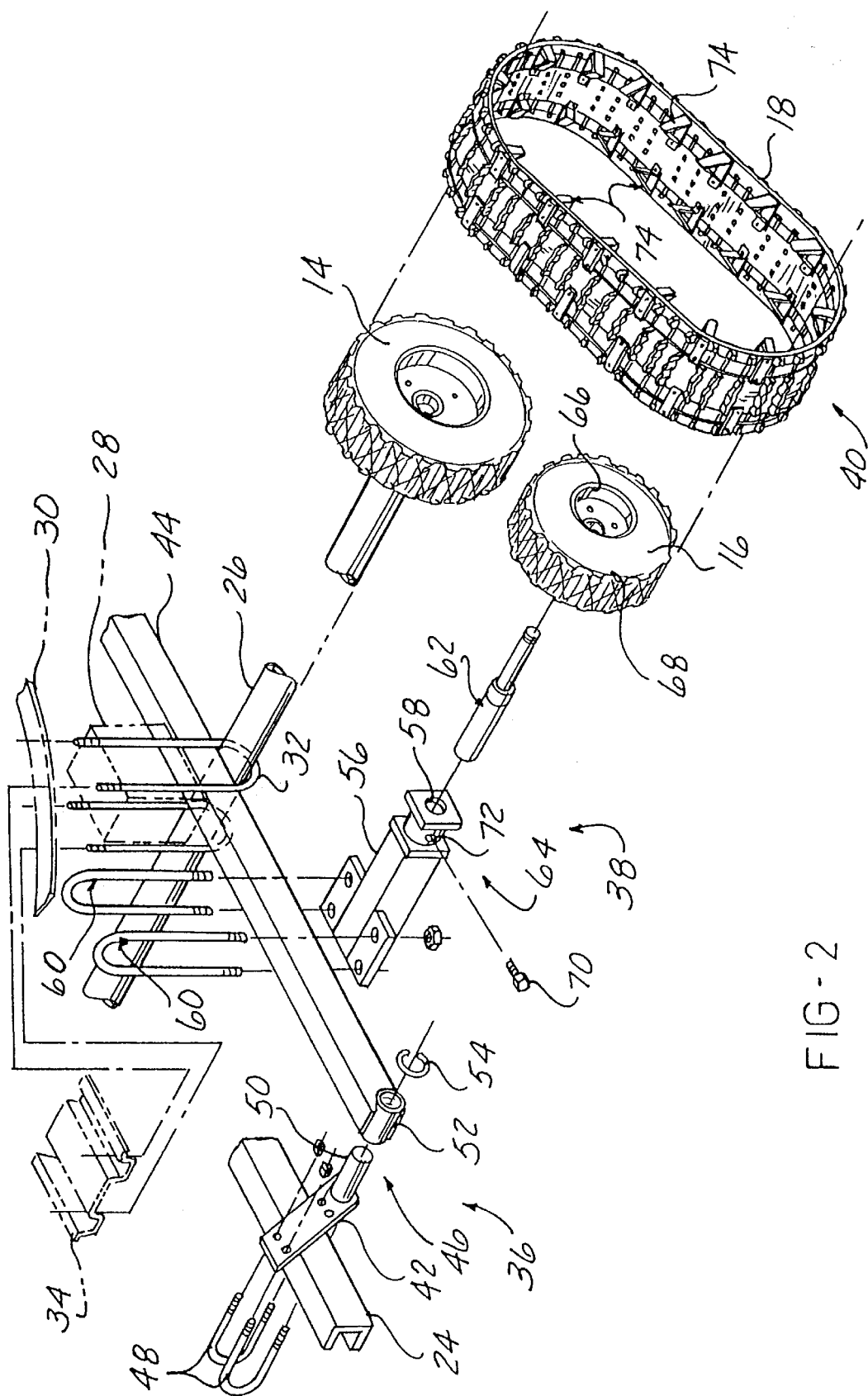
FIG. 2 is an exploded perspective detail view of the track drive conversion apparatus according to the present invention for one side of the wheel driven vehicle, the other side being a mirror image thereof.

A supporting wheel substitute or track drive conversation apparatus 10 according to the present invention is illustrated in FIGS. 1–3. A vehicle 12 is provided with a supporting wheel substitute 10 to engage the surface over which the vehicle 12 moves. The apparatus 10 can include a flexible track assembly having a pair of longitudinally spaced end wheels, 14 and 16 respectively, and a flexible track 18 trained about the wheels 14 and 16. At least one of the wheels 16 is movable or adjustable in a direction with relation to the other wheel 14, so that the adjustable wheel 16 may be selectively secured in various positions closer to or further away from the other wheel 14. The other wheel 14 preferably is a driven wheel of the vehicle 12. The vehicle 12 according to the present invention is a motor driven vehicle adapted or retrofitted to receive the track drive conversion apparatus 10 according to the present invention so that the motor vehicle 12 is driven in a way other than the mere rotation of the front and/or rear ground engaging wheels, 20 and 14 respectively, as ground-engaging traction-wheels. The track drive conversion apparatus 10 adapts the motor vehicle 12 to travel on a flexible track 18 carried by the vehicle 12. Preferably, the track 18 is flexible and endless. According to the present invention, a ground engaging wheel 14 is adapted to assist the endless track 18 in supporting and/or propelling the vehicle 12. As is conventional, the front road wheels 20 can be turned to steer the vehicle. The vehicle 12 can be a two wheel drive vehicle, four wheel drive vehicle, or a vehicle switchable between two and four wheel drive. In the case of a four wheel drive vehicle, or a switchable vehicle in four wheel drive mode, the front ground-engaging wheels 20 steer the vehicle, while all four wheels support and propel the vehicle in cooperation with the track 18. Preferably, the motor vehicle according to the present invention includes at least one end portion of the track 18 trained over a supporting structure 22 having an end wheel 16. The supporting structure 22 is mounted to the vehicle 12 for movement in a vertical plane relative to the vehicle frame 24.

Referring now specifically to FIG. 2, a vehicle frame 24 extends longitudinally from a front end toward a rear end of the vehicle, and is supported above the rear drive axle 26 of the vehicle by a vehicle body stop or cushion 28 and one or more leaf springs 30. Prior to conversion, the stops 28 and leaf springs 30 on both sides of the vehicle are held in place with respect to the rear drive axle 26 with U-bolt connectors or fasteners 32 extending around the rear drive axle 26 upwardly past the stops 28 and above the leaf springs 30 for engagement through an end plate 34, where the U-bolt connectors are held in place with nuts (not shown). The rear drive axle 26 rotatably supports driven wheel 14.

The track drive conversion apparatus 10 includes frame means 36 pivotally connectible to the vehicle frame 24. The frame means 36 extends longitudinally along the vehicle support frame 24 inboard of the driven wheel 14 for movement in a vertical plane with respect to the vehicle support frame 24. End wheel means 38 is supported from the frame means 36 for selective longitudinal adjustment along the frame means 36 with respect to the driven wheel 14. Track means 40 can be formed in an endless loop for encircling the driven wheel 14 and the end wheel means 38. Rotation of the driven wheel 14 in either direction rotates the track means 40 in the same rotational direction about the end wheel means 38.

The frame means 36 can include a first frame member 42 connectible to the support frame 24 of the vehicle 12 spaced longitudinally forward from the driven wheel 14. A second frame member 44 extends from an inboard position with respect to the driven wheel 14 forwardly toward the first frame member 42. Pivot means 46 is provided for connecting the first frame member 42 to the second frame member 44 at a position spaced longitudinally from the driven wheel 14. The second frame member 44 preferably extends rearwardly over the rear drive axle 26 of the vehicle 12. The second frame member 44 is positioned between the rear drive axle 26 and the vehicle body stop or cushion 28. The U-bolt connectors 32 previously used on the vehicle are replaced with longer U-bolt fasteners 32 in order to accommodate the additional length required by insertion of the second frame member 44. The first frame member 42 can be secured to the support frame 24 of the vehicle 12 by any suitable means, such as welding, bolting or the like. The connection between the first frame member 42 and the support frame 24 of the vehicle 12 can be either permanent, such as by welding, or temporary, such as by connection with U-bolt fasteners 48 extending around the vehicle support frame 24 and passing through apertures formed in the first frame member 42 for securement thereto with corresponding nuts. Pivot means 46 can include a pin 50 connected to one of the first and second frame members, 42 and 44 respectively, cooperatively engageable with a pin-receiving aperture or sleeve 52 associated with the other of the first and second frame members, 42 and 44 respectively. A groove (not shown) can be formed in the pin 50 for receiving a C-shaped retaining ring 54 for maintaining the sleeve 52 pivotally mounted on the pin 50. The C-shaped retaining ring 54 can be replaced with a cotter pin, or any other suitable means for securing the sleeve 52 with respect to the pin 50.

The end wheel means 38 can include a support member 56 having an aperture 58 formed therein. Means 60 is provided for connecting the support member 56 selectively along the longitudinal length of the frame means 36. Shaft means 62 engages within the aperture 58 formed in the support member 56. The shaft means 62 has a longitudinal axis generally parallel to and offset from an axis of rotation of the driven wheel 14. The shaft means 62 supports the end wheel means 38 for rotation with respect to the longitudinal axis of the shaft means 62. As is conventional, a wheel-supporting flange with longitudinally extending lugs is pivotally mounted on the shaft means 62 by appropriate bearings for rotation with respect thereto. Means 64 is provided for aligning the end wheel means 38 with respect to the driven wheel 14 in a common plane of rotation normal to both the longitudinal axis of the shaft means 62 and the axis of rotation of the driven wheel 14. The end wheel means 38 can include an end wheel 16 connected to the shaft means 62 for rotation about the longitudinal axis. The end wheel 14 can include a rim 66 rotatably connectible to the shaft means 62 by engagement with the axially extending lugs of the wheel-supporting flange rotatably mounted to the shaft means 62. A pneumatic tire 68 is mountable on the rim 66 and inflatable to a desired pressure for tensioning the track means 40 when trained about the drive wheel 14 and end wheel 16 in an endless loop. The aligning means 64 can include a set screw 70 engageable within a radially extending threaded bore 72 in the support member 56 for adjustably engaging and holding the shaft means 62 in a desired position of extension and retraction with respect to the aperture 58 through the support member 56 for aligning the end wheel 16 in a common rotational plane with the drive wheel 14.

The track means 40 can include an endless flexible track 18. As best seen in FIG. 3, the track 18 preferably includes radially inwardly extending protrusions 74 spaced circumferentially around an inner surface of the track 18 adjacent both an inboard and outboard edge of the track 18. Preferably, the protrusions 74 are formed of sufficient size and shape to be engageable with a portion of the inboard and outboard sidewalls of the driven wheel 14 and the end wheel 16 to maintain the track 18 centered with respect to a common plane of rotation normal to both longitudinal axes of rotation of the end wheel 16 and the driven wheel 14. It has been found that a suitable track for modification can be purchased under the tradename SUPER K track from KIMPEX ® snowmobile, a company located in the City of Champlain in the State of N.Y. The track preferably is a Kevlar reinforced track with a traction rib. The Kevlar cording in the track provides increased strength, high flexibility over a large temperature range, resistance to stretching associated with higher speeds and offers a high strength to weight ratio allowing the track to be lighter and more fuel efficient in use. The track 18 can be made using natural rubbers, fiberglass rods and nylon fabrics in combination to produce a high strength, lightweight track for better fuel consumption. Ultra strength Kevlar cording and polyester substrata can also be used for superior resistance to rupture and stretching during the life of the track. A Kevlar reinforced track may have an initial break-in period during which the track may require minor adjustments. Typically, after a few hours of use and minor adjustment, additional adjustments are rarely needed.

The standard track is preferably modified to include a plurality of generally triangular shaped protrusions 74 spaced peripherally along the inboard and outboard edge of the track 18. Each protrusion 74 has a base 76 with a plurality of apertures 78 formed therein as best seen in FIG. 3. The base 76 is engageable with the inner surface of the track 18 and is positioned adjacent either the inboard and outboard edge of the track. The protrusions 74 also include inwardly extending first and second legs, 80 and 82 respectively, from the base 76 of the triangular shaped protrusions. The inwardly facing leg 82 is adapted to engage with a portion of the inboard or outboard sidewall of the driven wheel 14 and the end wheel 16 to maintain the track 18 centered with respect to a common plane of rotation. A plurality of fasteners 84 extend through the apertures 78 in the base 76 of the protrusions 74 and pass through the track 18 before passing through apertures 86 formed in retaining plate 88 disposed on the outer surface of the track 18. Nuts 90 are connected to the outer threaded ends of the fasteners 84 in order to secure the radially inwardly extending protrusions 74 and retaining plate 88 to the track 18. It is envisioned that the track 18 in its preferred form can be produced or manufactured having the radially inwardly extending protrusions 74 formed integral with the track 18, rather than being individually attached to each track.

For purposes of illustration, and not limitation, the present invention will be described with respect to a four wheel drive vehicle 12 having a support frame 24. It has been found that when using the track drive conversion apparatus 10 of the present invention with a four wheel drive vehicle, that the diameter of the front and rear drive wheels must be slightly different in order to account for the increased diameter of the supporting rear drive wheel substitute when the track drive conversion apparatus is connected to the vehicle. For example, 33 inch diameter front wheel drive tires can be connected to the four wheel drive vehicle, while 31 inch diameter rear wheel drive tires are mounted on the vehicle. Toward the front on both sides of the vehicle, first downwardly extending frame members 42 are connected to the vehicle frame 24. Each of the first frame members 42 has an outwardly extending pivot pin 50 connected thereto. The rear end of the vehicle, or bed of a pickup truck, is raised approximately 2 to 4 inches allowing insertion of second forwardly extending frame members 44 on both sides of the vehicles above the rear wheel drive axle 26. The second frame members 44 extend forwardly from the position above the rear wheel axle 26 to pivotally connect to the pivot pin 50 connected to the respective first frame members 42 on both sides of the vehicle. An end wheel 14, or idler wheel, is connected to each of the second frame members 44 forwardly with respect to the rear drive wheels 14 on both sides of the vehicle. The end wheel assembly includes a shaft support member 56 connected to each second frame member 44 by suitable fasteners, such as U-shaped bolts allowing for longitudinal adjustment along the respective length of the second frame members 44 to accommodate the length of track 18 to be installed over the drive wheel 14 and end wheel 16. The end wheel shaft 62 is engageable within a longitudinal aperture 58 formed in the support member 56 and allows for longitudinal adjustment of the end wheel 16 in order to properly align the end wheel 16 with the drive wheel 14. After the end wheel 16 is properly aligned with the drive wheel 14, the end wheel shaft 62 is held in position within the aperture 58 formed in the support member 56 by a set screw 70 or any other suitable means. The end wheel 16 can then be mounted on the shaft 62 and secured thereto in a conventional manner. The track 18 is then positioned over the drive wheel 14 and the end wheel 16, with the end wheel 16 at least partially deflated. The support member 56 is then moved longitudinally away from the drive wheel 14 in order to take up most of the slack of the track 18 extending over the drive wheel 14 and the end wheel 16. The support member is then fastened securely in the desired longitudinal position along the second frame member 44 on each side of the vehicle. After securing the support member 56 in the desired longitudinal position with respect to the second frame member 44 and the drive wheel 14, the end wheel 16 is then inflated to provide the desired tension on the track 18 extending around the drive wheel 14 and the end wheel 16. Once this is accomplished on both sides of the vehicle 12, the vehicle is ready for use. In this illustration, it is preferred that the end wheel 16 have a smaller diameter than the driven wheel 14, such as a 25 inch diameter tire when the driven wheel has a 31 inch diameter. The smaller diameter end wheel provides a slight upward incline for the track with respect to the ground over which the vehicle is traveling. When the track 18 is installed over the driven wheel 14, the effective diameter of the track is approximately 33 inches in diameter to provide the proper ratio of front wheel diameter to rear "wheel" diameter to prevent damage to a four wheel drive vehicle transmission. If track 18 is used on a two wheel drive vehicle, the front and rear tire diameters can be identical or different without adverse affects.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for converting a wheel driven vehicle having a support frame and a driven wheel to a track driven vehicle, said driven wheel connected to an axle of said vehicle, said apparatus comprising:

frame means pivotally connectible to said support frame, said frame means extending longitudinally along said support frame inboard of said driven wheel for movement in a vertical plane with respect to said support frame of said vehicle, said frame means defined at least in part by a frame member interposed between said axle and said support frame of said vehicle, said frame member extending outwardly from said driven wheel toward a longitudinal end of said vehicle;

end wheel means supported from said frame means for selective longitudinal adjustment along said frame means; and track means operably engageable for encircling said driven wheel and said end wheel means in an endless loop, such that rotation of said driven wheel in either direction rotates the track means in the same rotational direction about the end wheel means.

2. The apparatus of claim 1 wherein said frame means further comprises:

a first frame member connectible to said support frame of said vehicle spaced longitudinally from said driven wheel;

a second frame member extending from an inboard position with respect to said driven wheel toward said first frame member; and pivot means for connecting said first frame member to said second frame member spaced longitudinally from said driven wheel.

3. The apparatus of claim 1 wherein said end wheel means further comprises:

a support member having an aperture formed therein;

means for connecting the support member selectively along the longitudinal length of the frame means; and shaft means engageable within the aperture formed in the support member, said shaft means having a longitudinal axis generally parallel to and offset from an axis of rotation of the driven wheel, said shaft means for supporting said end wheel means for rotation with respect to said longitudinal axis.

4. The apparatus of claim 3 further comprising means for aligning said end wheel means with respect to said driven wheel in a common plane of rotation normal to both said longitudinal axis of said shaft means and said axis of rotation of said driven wheel.

5. The apparatus of claim 3 further comprising:

said end wheel means including an end wheel connected to said shaft means for rotation about said longitudinal axis.

6. The apparatus of claim 5 wherein said end wheel further comprises:

a rim rotatably connectible to said shaft means; and a pneumatic tire mountable on said rim and inflatable to a desired pressure for tensioning said track means when encircled about said driven wheel and said end wheel.

7. The apparatus of claim 3 further comprising:

a set screw engageable with respect to said support member for adjustably engaging and holding said shaft means in a desired position of extension and retraction with respect to said aperture through said support member for aligning said end wheel means in a common rotational plane with said driven wheel.

8. An apparatus for converting a wheel driven vehicle having a support frame and a driven wheel to a track driven vehicle comprising:

frame means pivotally connectible to said support frame, said frame means extending longitudinally along said support frame inboard of said driven wheel for movement in a vertical plane with respect to said support frame of said vehicle;

end wheel means supported from said frame means for selective longitudinal adjustment along said frame means; and track means operably engageable for encircling said driven wheel and said end wheel means in an endless loop, such that rotation of said driven wheel in either direction rotates the track means in the same rotational direction about the end wheel means, wherein said track means includes an endless, flexible track having radially inwardly extending protrusions spaced circumferentially around an inner surface of said track adjacent both an inboard and outboard edge of said track, such that said protrusions are engageable with a portion of the inboard and outboard sidewalls of said driven wheel and said end wheel means to maintain said track centered with respect to a common plane of rotation normal to longitudinal axes of rotation of said end wheel means and said driven wheel.

9. An apparatus for converting a wheel driven vehicle having a support frame and a driven wheel to a track driven vehicle, said driven wheel connected to an axle of said vehicle, said apparatus comprising:

first and second frame members pivotally connectible to said support frame for movement in a vertical plane with respect to said support frame of said vehicle, said first and second frame members extending longitudinally along said support frame inboard of said driven wheel on first and second sides of said vehicle respectively, said first and second frames each defined at least in part by an elongate frame member interposed between said axle and said support frame of said vehicle, said elongate frame member extending outwardly from said rear wheel toward a longitudinal end of said vehicle;

first and second end wheels supportable from said first and second frame members respectively for selective longitudinal adjustment along said respective frame members; and first and second endless, flexible tracks operably engageable for encircling said respective driven wheel and end wheel, such that rotation of each driven wheel in either direction rotates the corresponding track in the same rotational direction about the respective end wheel.

10. The apparatus of claim 9 further comprising:

first and second support members having apertures formed therein;

means for connecting the support members selectively along the longitudinal length of the respective frame members; and first and second shafts engageable within the aperture formed in the respective support member, said shafts having longitudinal axes generally parallel to and offset from axes of rotation of the driven wheels, said shafts for supporting said end wheels for rotation with respect to said longitudinal axis.

11. The apparatus of claim 10 further comprising means for aligning said end wheel with respect to said respective driven wheels in respective common planes of rotation normal to both said longitudinal axis of said respective shafts and said respective axis of rotation of said driven wheels.

12. The apparatus of claim 10 further comprising:

said first and second end wheels connected to said respective shafts for rotation about said longitudinal axis.

13. The apparatus of claim 10 wherein said end wheel further comprises:

first and second rims rotatably connectible to said respective shafts; and first and second pneumatic tires mountable on said respective rims and inflatable to a desired pressure for tensioning said respective tracks when encircled about said respective driven wheels and end wheels.

14. The apparatus of claim 10 further comprising:

first and second set screws engageable with respect to said respective first and second support members for adjustably engaging and holding said respective shafts in desired positions of extension and retraction with respect to said apertures through said respective support members for aligning said end wheels in a common rotational plane with said respective driven wheels.

15. An apparatus for converting a wheel driven vehicle having a support frame and a driven wheel to a track driven vehicle comprising:

first and second frame members pivotally connectible to said support frame for movement in a vertical plane with respect to said support frame of said vehicle, said first and second frame members extending longitudinally along said support frame inboard of said driven wheel on first and second sides of said vehicle respectively;

first and second end wheels supportable from said first and second frame members respectively for selective longitudinal adjustment along said respective frame members; and first and second endless, flexible tracks operably engageable for encircling said respective driven wheel and end wheel, such that rotation of each driven wheel in either direction rotates the corresponding track in the same rotational direction about the respective end wheel, wherein each of said first and second tracks further includes an endless, flexible track having radially inwardly extending protrusions spaced circumferentially around an inner surface of said track adjacent both an inboard and outboard edge of said track, such that said protrusions are engageable with a portion of the inboard and outboard sidewalls of said driven wheel and said end wheel to maintain said track centered with respect to a common plane of rotation normal to both longitudinal axes of rotation of said end wheel and said driven wheel.

16. A supporting wheel substitute connectible to a driven wheel of a vehicle having a support frame comprising:

a frame pivotally connectible to said support frame of said vehicle for movement in a vertical plane relative to said support frame of said vehicle;

an end wheel positionablely spaced longitudinally from said driven wheel of said vehicle along said frame;

adjustable means for selectively securing said end wheel in various longitudinal positions along said frame with respect to said driven wheel of said vehicle; and an endless, flexible track trainable over said end wheel and said driven wheel of said vehicle and engageable with a surface over which said vehicle is moving, said track having radially inwardly extending protrusions spaced circumferentially around an inner surface of said track adjacent both an inboard and outboard edge of said track, such that said protrusions are engageable with a portion of the inboard and outboard sidewalls of said driven wheel and said end wheel to maintain said track centered with respect to a common plane of rotation normal to longitudinal axes of rotation of said end wheel and said driven wheel.

17. A supporting wheel substitute connectible to a driven wheel of a vehicle having a support frame, said driven wheel defined by a motor driven wheel connected to a drive axle of said vehicle, said supporting wheel substitute comprising:

a frame pivotally connectible to said support frame of said vehicle for movement in a vertical plane relative to said support frame of said vehicle, said frame defined at least in part by an elongate frame member interposable between said drive axle and said support frame of said vehicle, said elongate frame member extending outwardly from said driven wheel toward a longitudinal end of said vehicle and pivotally connectible to said support frame spaced longitudinally from said driven wheel;

an end wheel positionablely spaced longitudinally from said driven wheel of said vehicle along said frame;

adjustable means for selectively securing said end wheel in various longitudinal positions alone said frame with respect to said driven wheel of said vehicle; and an endless, flexible track trainable over said end wheel and said driven wheel of said vehicle and engageable with a surface over which said vehicle is moving.

* * * * *